Figure 9:
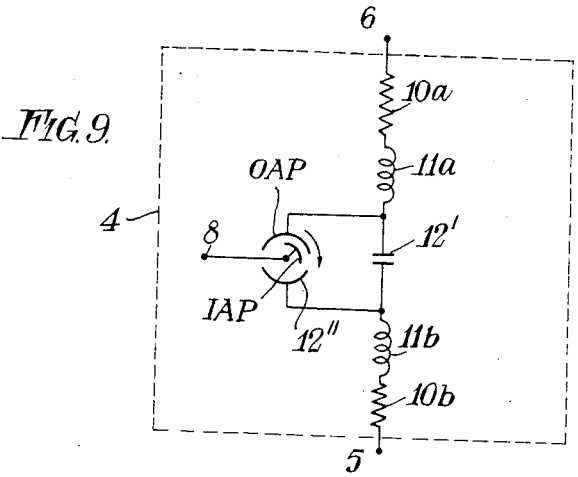

Oct. 30, 1956 N. LEA 2,769,090
FREQUENCY STABILIZERS AND MONITORS
Filed Oct. 21, 1953 4 Sheets-Sheet 1
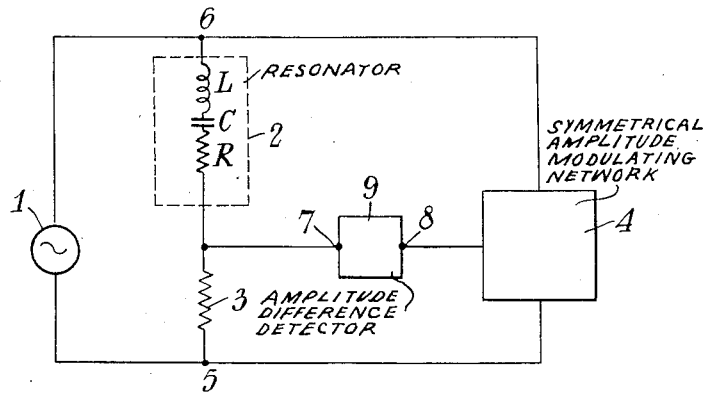
Fig. 1.
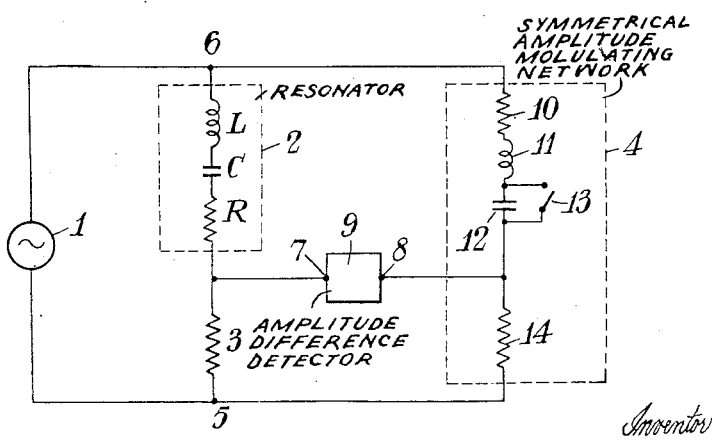
Fig. 2. Fig. 4. Fig. 5.
Fig. 3.
Inventor:
Norman Lea
Attorneys:
Baldwin & Wight Oct. 30, 1956  N. LEA  2,769,090
FREQUENCY STABILIZERS AND MONITORS
Filed Oct. 21, 1953  4 Sheets-Sheet 2
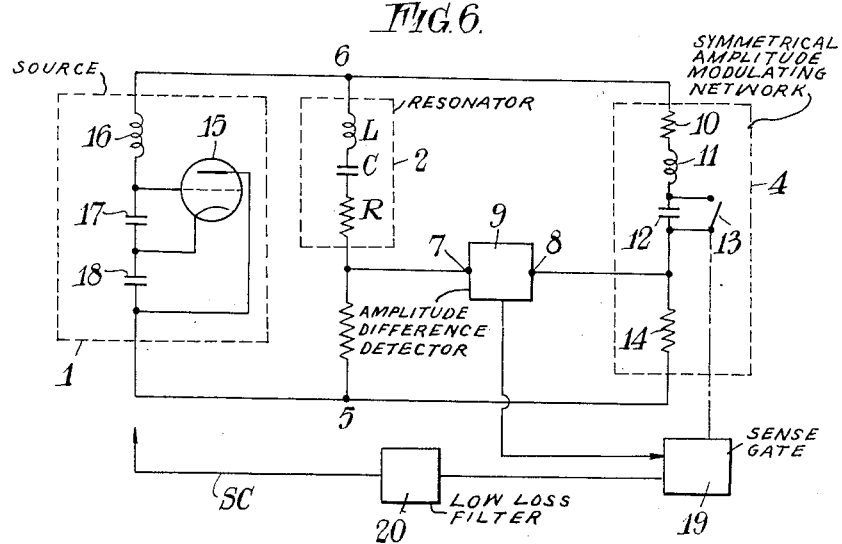
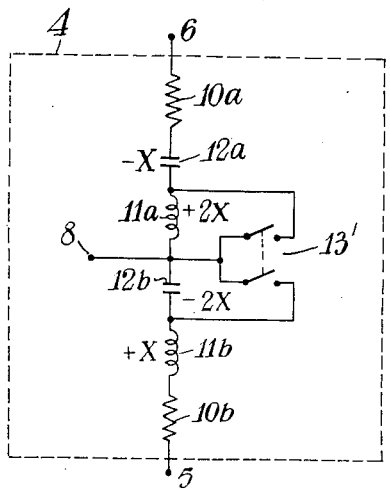
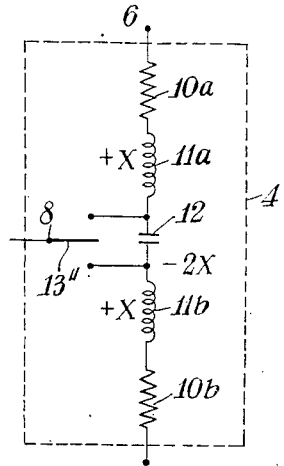
Inventor:
Norman Lea
Attorneys:
Baldwin & Wight

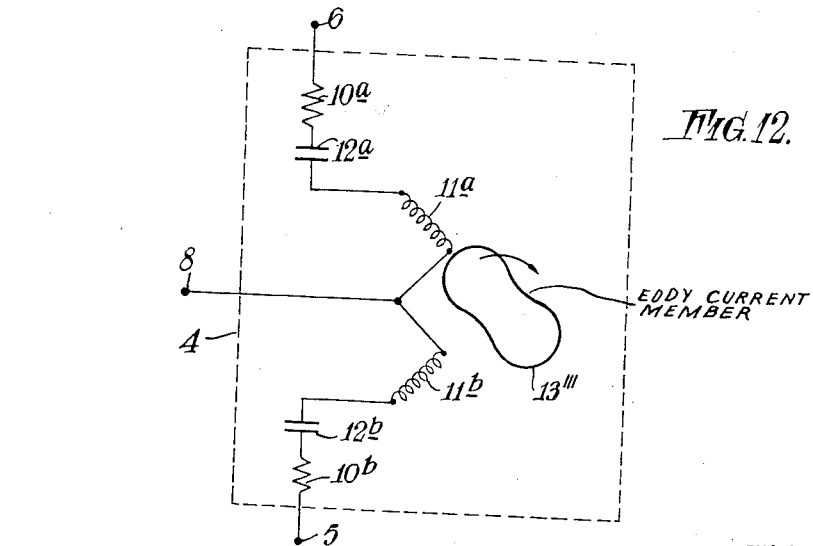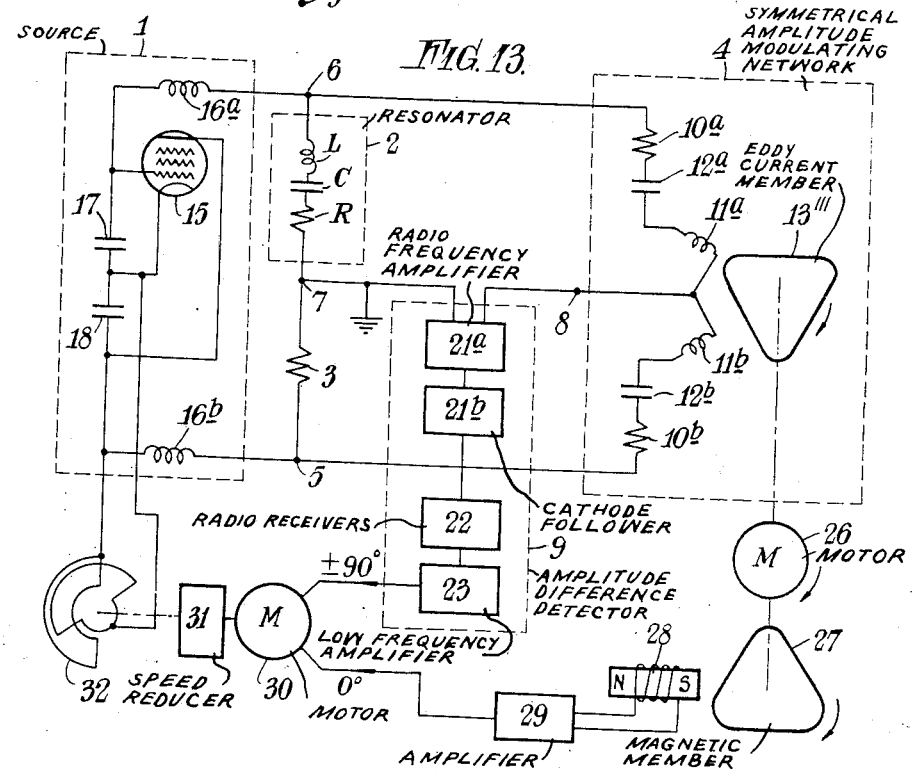

United States Patent Office 2,769,090
Patented Oct. 30, 1956

2,769,090
FREQUENCY STABILIZERS AND MONITORS

Norman Lea, Chelmsford, England, assignor to Marconi's Wireless Telegraph Company Limited, London, England Application October 21, 1953, Serial No. 387,489

Claims priority, application Great Britain October 23, 1952

8 Claims. (Cl. 250—36)

This invention relates to frequency stabilizers and monitors that is to say to devices whereby the frequency of a source of oscillations may be automatically controlled to be in accord with the natural frequency of a resonator (stabilizer) or devices whereby any departure in frequency of said source from the natural frequency of a resonator may be indicated (monitors).

The object of the invention is to provide improved frequency stabilizers and monitors which shall be of less complexity than known stabilizers or monitors of comparable accuracy of operation or indication.

Known stabilizers and monitors of high accuracy of operation or indication fall into one or other of two general classes namely that in which departures from equal amplitude of response of single resonator to two frequencies is employed or indicated and that in which departures from equal amplitudes of response of two resonators to a single frequency are employed or indicated. Devices of both these classes are complex and difficult to set up and operate by reason of the use in the one case of two frequencies and in the other of two resonators and the present invention provides arrangements wherein only a single frequency and a single resonator are employed.

According to this invention a frequency stabilizer or monitor comprises an oscillation source to be stabilized or monitored, a resonator with reference to whose natural frequency the said source is to be stabilized or monitored, the resonator being connected to be fed from said source, a symmetrical amplitude modulating network also connected to be fed from said source, an amplitude difference detector arranged to be fed from said resonator and from said network, and means connected to receive the output from said detector for controlling the frequency of said source to restore the condition of equal inputs to said detector or for indicating any departure from said condition.

The terms "symmetrical amplitude modulating network," "symmetrical amplitude modulation" and similar terms employing the word "symmetrical" with reference to amplitude modulation are used herein in a rather special sense, the nature of which will be understood later.

The invention is illustrated in and further explained in connection with the accompanying drawings, in which Fig. 1 is a highly simplified diagram illustrating the principle of the invention; Fig. 3 is a diagram corresponding to Fig. 1 but showing one form of symmetrical amplitude modulating network in some detail; Figs. 6 and 13 are diagrams of frequency stabilizers in accordance with the invention; Figs. 7, 8, 9, 10, 11 and 12 are diagrams of different forms of symmetrical amplitude modulating networks which may be used in carrying out the invention; and Figs. 2, 4 and 5 are explanatory vector diagrams.

Referring to Fig. 1 a source of frequency to be stabilized or monitored is conventionally indicated at 1 and a resonator is conventionally indicated at 2 as comprising inductance L, a capacity C and resistance R, in series. The resonator 2 is in series with a resistance 3 across the source 1. A symmetrical amplitude modulating network 4 the nature of which will be described later herein is also connected across the source 1. 9 is an amplitude difference detector which compares the amplitudes fed to it from the network 4 on the one hand and from the junction of the resonator 2 with the resistance 3 on the other and gives an output dependent on said difference. The output from the detector 9—the detector output circuit is not indicated in Fig. 1—is used to control the frequency of the source 1 to maintain it at the natural frequency of the resonator 2 (in the case of a stabilizer) or to indicate departures of the frequency of the source 1 from the natural frequency of the resonator 2 (in the case of a monitor). The resonator 2 is designed to operate at or very near the frequency of series resonance and may be of any suitable kind being represented in Fig. 1 by its equivalent series elements L, C and R. In use there will be set up across resistance 3 voltages indicative of the response of the resonator 2. Various points in the circuit of Fig. 1 are indicated by numerals which have not yet been referred to, these numerals being provided to define the points between which voltages represented by correspondingly designated vectors in the vector diagram of Fig. 2 appear.

Referring to Fig. 2 which shows the condition of series resonance, the whole vector 5—6 represents the voltage across the resonator 2 and resistance 3 in series, that across the resistance 3 being represented by the vector 5—7 and that across the resonator 2 being represented by the vector 7—6. The symmetrical amplitude modulating network provides alternately two output voltages corresponding to the two opposite directions of modulation (plus and minus) so that between the terminals 7, 8 of the amplitude difference detector 9 there appear alternately voltages represented by the vectors 7—8a and 7—8b. These voltages are such that the line joining the ends 8a and 8b of these two vectors is at right angles to the vector 5—6 and the term "symmetrical" in the expression "symmetrical amplitude modulating network" and similar expressions is used herein to define amplitude modulation such that this right angled relationship between the line 8a—8b and the vector 5—6 is produced i. e. such that the vectors 7—8a and 7—8b are of the same length and at equal angles to the vector 5—6.

With this arrangement, as will be apparent from the vector diagram of Fig. 2, so long as the frequency of the source 1 is in accord with the natural frequency of the resonator 2 there will be zero output from the amplitude difference detector 9 but any departure from this condition will produce a detector output which is used, in the case of a stabilizer, for automatically adjusting the frequency of the source 1 to re-establish the required condition or in the case of a monitor for indicating departure from the required condition.

Fig. 3 corresponds to Fig. 1 and shows one form of network for use at 4. In Fig. 3 this network is shown as comprising, in series with one another, a resistance 10, an inductance 11, a condenser 12 and a resistance 14, the condenser 12 being shunted by a switch 13 which is opened and closed at a required frequency to produce the change from vector 7—8a to vector 7—8b. The reactance of the condenser 12 is made twice the numerical value of the reactance of the inductance 11 so that opening and closing of the switch 13 causes equal and opposite reactances to be interposed between the resistance 10 and the network output terminal 8 between the condenser 12 and the resistance 14.

For the condition of zero reactance in the resonator 2 i. e. when the frequency from the source 1 is exactly in accord with the natural frequency of said resonator; the voltage vectors between the appropriately numbered points in Fig. 3 are as represented in Fig. 4, the vectors which apply when the switch 13 is closed being shown in full lines and those which occur when the switch 13 is opened being shown in broken lines. It will be clear from Fig. 4 that in this condition—i. e. correct frequency—the output from the amplitude difference detector 9 will be zero. If, however, the frequency of source 1 departs from the natural frequency of the resonator 2 the symmetrical vector diagram of Fig. 4 will give place to an asymmetrical diagram such, for example, as that shown in Fig. 5 in which the vector distance 7—8a is no longer the same as the vector distance 7—8b. Accordingly the amplitude difference detector 9 will produce an output which may be utilized for stabilizing or monitoring.

In order that the amplitude difference shall be a maximum for a given departure of the frequency of the source 1 from the resonance frequency of the resonator 2, the point 7 should be not far removed from the line joining the points 8a and 8b. This requires that the resistances $R_2$, $R_3$, $R_{10}$ and $R_{14}$ respectively of the parts 2, 3, 10 and 14 should approximately comply with the relationship $$\frac{R_2}{R_3} = \frac{R_{10}}{R_{14}}$$

However, any departure from this relationship merely reduces sensitivity but does not introduce frequency error.

In Fig. 3 the symmetrical amplitude modulation is represented as obtained by means of a switch and the amplitude modulation is therefore of the rectangular or square type, the arrangement of the figure employing two discrete values of reactance which are alternately applied in the network 4. This, however, is not a necessary condition and the inductance 11, condenser 12 and switch 13 may be replaced by a smoothly variable reactance which is varied in time in accordance with some other symmetrical law—for example a sine wave law. Many means for producing symmetrical sine wave variations of reactance—both electro-mechanical means and electronic means—are known and any suitable choice of them may be made.

So far as this invention is concerned the only requirement for the source 1 is that it shall be capable of applying the necessary power at the desired frequency with sufficiently satisfactory short time frequency stability over the period required for automatic or manual frequency correction in the event of departure from the desired condition.

If the impedance of the network 4 is large compared with the impedance of the resonator 2 and resistance 3 in series the latter impedance can be regarded as that of a series resonator degraded as to its Q value by the resistance 3. If this degradation is not very serious—for example if it is only by a factor of 2—sufficient initial stability for the generated frequency can be obtained merely by constructing the source 1 as a negative resistance with little or no intrinsic frequency dependence.

Fig. 6 shows a stabilizing arrangement in which this is done.

Referring to Fig. 6 the source 1 is here constituted by a thermionic amplifier valve 15 (shown as a triode for simplicity) with its input obtained from across a condenser 17 and its output applied across a condenser 18, the inductance 16 in series with these two condensers being adjusted approximately to resonance therewith. This valve oscillator circuit is shown in simplified form, the obvious and well known D. C. circuits being omitted so as not to complicate the drawing. The ratio of the value of the inductance 16 to the values of the condensers 17 and 18 in series therewith is chosen in accordance with well known principles so that the amplifier 15 is matched as well as possible to the load applied thereto by the resonator 2.

The amplitude of the oscillations from the source i. e. between points 5 and 6 is chosen in accordance with known principles to ensure good operation of the resonator 2. Safe operation of the resonator may be assured by providing an amplitude limiter for the output from the source 1. If desired the said source may be provided with an automatic gain control system as well known per se to maintain the level high enough to ensure that noise effects shall be negligible but at the same time low enough to avoid damage to the resonator.

Fig. 6 indicates the output circuit from the amplitude difference detector 9. As will be seen this output is fed to what may be termed a "sense gate" 19 which is gang-controlled with the modulating switch 13 so that when the switch 13 is in one position the sense gate 19 passes an output of one sense and when it is in the other position it passes an output of the opposite sense. The sense gated output from the device 19 is fed through a low pass filter 20 which removes modulating frequencies and thence over the lead SC to produce servo-control of the frequency of the source 1 in any convenient manner (not shown) e. g. by controlling a reactance valve included in one of the condensers 17 or 18.

The network 4 shown in Fig. 6 will have a current input from points 5 and 6 which changes its phase when the switch 13 is operated. This will produce some small frequency modulation of the generated frequency. In order to avoid this it may be preferred to use for the network 4 one of fixed impedance such as are shown in Figs. 7, 8, 9, 10, 11 and 12.

In Fig. 7 there are two resistances 10a, 10b, two inductances 11a, 11b and two condensers 12a, 12b, the single pole switch 13 of Figs. 3 and 6 being replaced by a double pole switch 13'. The relative reactances of the elements 11a, 11b, 12a and 12b are conventionally indicated by the values of X marked against them, the negative sign being employed for a capacitative reactance and the positive one for an inductive reactance. As will be apparent the input impedance of the network of Fig. 7 is not changed by operating the switch 13'.

Similar remarks apply to the modified form of network shown in Fig. 8. Here there are two resistances 10a, 10b, two inductances 11a, 11b and a single condenser 12, the switch used being a change-over switch 13" so that in effect the arrangement of Fig. 8 is a two part network the parts of which are connected in circuit in alternation. As in Fig. 7 reactance values are indicated by values of X.

Figure 10:
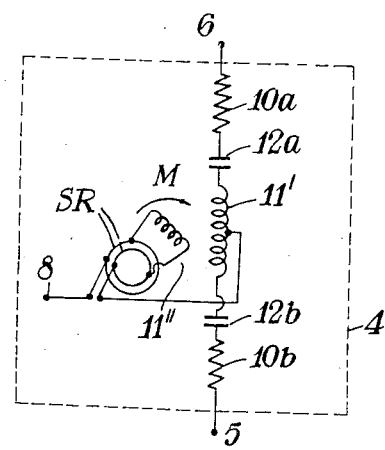

Fig. 10 shows another constant input impedance network which comprises two resistances 10a, 10b and two condensers 12a, 12b. Here, however, the switch is omitted and the inductance portion of the network is constituted by an arrangement giving smooth reactance variation. This inductance arrangement consists of a fixed inductance portion 11', a second inductance portion 11" and a variable inductance portion constituted by mutual inductance M between the parts 11' and 11". Variation of the mutual inductance is obtained by rotating the coil 11" as indicated by the arrow about the axis of the slip rings SR through which it is connected in circuit.

Figure 11:
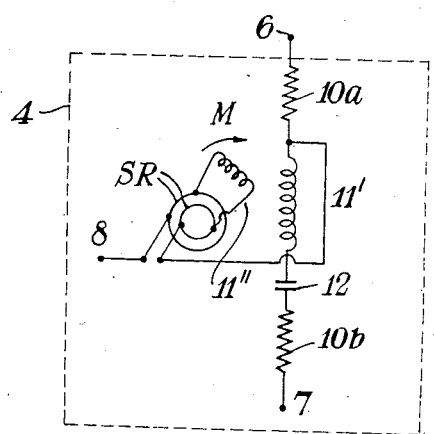

The networks of Figs. 10 and 11 can be regarded as having fixed input impedances as the current drawn by the detector 9 is negligible, i. e. there is negligible current in the coil 11".

Fig. 11 shows another arrangement like that of Fig. 10 in that reactance variation is obtained by variation of mutual impedance M. In Fig. 11 there are two resistances 10a, 10b, a condenser 12, and a fixed inductance portion 11' coupled by a variable mutual inductance M to a further inductance portion 11" connected in circuit through slip rings SR.

Fig. 9 shows a further form for the network 4 also of the smoothly variable reactance type there being again no switch. In Fig. 9, however, instead of producing variations of the inductance of the network, variation of the capacity is produced the said capacity being made up of a fixed portion 12' and a variable portion 12" which is conventionally indicated and which is varied by rotating an inner plate IAP which is in variable capacitative relationship with a pair of fixed outer plates OAP. In practice the plates of this device would be shaped so that the variation of voltage at the terminal 8 followed a preferred wave form e. g. a sine wave, while ensuring that, in all positions of the moving electrode IAP a nearly constant capacitance was imposed in parallel with capacitor 12'.

Fig. 12 shows yet another constant input ipedance network which comprises two resistances 10a, 10b, two capacitances 12a and 12b and two inductances 11a and 11b. The values of the inductances 11a and 11b are varied periodically by a two-lobed high conductivity eddy current member 13''' which latter is connected to be rotated by a motor (not shown). The shape of the member 13''' and the relative dispositions of the inductances 11a and 11b and the member 13''' are such that the sum of the values of the inductances is always approximately constant and such that their difference varies periodically to give the desired modulation of potential at terminal 8. The condensers 12a and 12b serve to counterbalance the sum of the reactive components of the inductances 11a and 11b so that the impedance across the network 4 is non-reactive. Hence the locus of the potential at the terminal 8 is vectorially at right-angles to the vector of the potential across the network 4.

The rotating eddy current member 13''', of course, serves a somewhat similar purpose to that of the switch 13' of Fig. 7.

It will be appreciated that the networks of Figs. 9 and 12 produce a sine wave modulation.

The stabilizer shown in Fig. 13 is a modified form of that of Fig. 6. The source 1 of Fig. 13 is similar to that of Fig. 6, except that the coil 16 of Fig. 6 is replaced by the coils 16a and 16b, which serve the same main purpose as the coil 16 of Fig. 6. The modulating network 4 of Fig. 13 is similar to that of Fig. 12, the only difference being that a three-lobed rather than a two-lobed eddy current member 13''', is used in the arrangement of Fig. 13. The amplitude difference detector 9 comprises a radio frequency amplifier 21a, a cathode follower 21b, a radio receiver 22 and a low frequency amplifier 23. The amplifier 21a has a high impedance input to obtain good sensitivity for the signal available at the terminals 7 and 8, and the cathode follower provides a suitable low impedance input for the radio receiver 22. The amplifier 23 has a maximum response at the frequency of modulation provided by the rotating member 13'''. The member 13''' is driven by a motor 26 which is also connected to rotate a three-lobed magnetic member 27. A polarized pick-up coil 28 is located adjacent the member 27 and the latter together with the rotating member 27, constitute a generator producing a reference phase output which is passed to an amplifier 29 and used to detect the sense of the output from the amplifier 23 by interaction in a two-phase motor 30. It will be understood that the frequency of the reference phase output is the same as the frequency of modulation provided by the rotating member 13'''. The relative angular position of the members 13''' and 27 is adjusted so that the inputs to the two-phase motor 30 are in quadrature with one another in spite of the phase shifts caused by the difference detector 9, the pick-up coil 28 and the amplifier 29. This ensures that the two-phase motor 30 will have a sense of rotation which depends upon the sense of the output of the difference detector 9. The spindle of the motor 30 is connected via a speed reduction gearbox 31 to control a variable condenser 32 which is in parallel with the condenser 18 of the source 1, the cathode of the valve 15 being "earthy." Rotation of the spindle of the motor 30 causes a variation in the value of the condenser 32 to re-set the frequency of the source 1 to the correct value.

The motor 30 is stabilized by the well-known servo technique of velocity-dependent braking.

I claim:

1. A frequency stabilizer or monitor comprising a source of oscillations to be stabilized or monitored, a resonator with reference to whose natural frequency said source is to be stabilized or monitored, said resonator being connected to be energized by said oscillations, a network including reactance and also connected to be energized by said oscillations, means for periodically changing in predetermined manner the reactance in at least a portion of said network, a detector responsive to the difference between two instantaneous amplitudes simultaneously fed thereto, means for feeding to said detector oscillatory output from said resonator and oscillatory output from said network, said last mentioned oscillatory output including output from said portion, and means controlled by the response of said detector for controlling the frequency of said oscillations to maintain said frequency in predetermined relationship with the natural frequency of said resonator or for indicating any departure from said relationship.

2. A frequency stabilizer or monitor as set forth in claim 1 wherein the resonator is connected in series with a resistance across the source and wherein the potential at the junction point of said resonator with said resistance constitutes the oscillatory output fed from said resonator to the detector.

3. A stabilizer or monitor as set forth in claim 1 wherein the means for periodically changing the reactance in at least a portion of the network effect reactance changes without changing the impedance of said network.

4. A stabilizer or monitor as set forth in claim 1 wherein the means for periodically changing the reactance in at least a portion of the network effect reactance changes without changing the impedance of said network, said network comprising series connected resistive, inductive and capacitative elements, means being provided for connecting the detector on one side to an intermediate point on said network and means being provided for periodically effectively altering said point of connection so that the reactance between said point and one end of said network is periodically changed from being predominantly inductive to being predominantly capacitative and vice versa by substantially equal amounts.

5. A stabilizer or monitor as set forth in claim 1 wherein the means for periodically changing the reactance in at least a portion of the network effect reactance changes without changing the impedance of said network, said network comprising series connected resistive, inductive and capacitative elements, means being provided for connecting the detector on one side to an intermediate point on said network and means being provided for periodically effectively altering said point of connection so that the reactance between said point and one end of said network is periodically changed from being predominantly inductive to being predominantly capacitative and vice versa by substantially equal amounts, said last mentioned means comprising a periodically operated reactance changing switch.

6. A stabilizer or monitor as set forth in claim 1 wherein the means for periodically changing the reactance in at least a portion of the network effect reactance changes without changing the impedance of said network, said network comprising series connected resistive, inductive and capacitative elements, means being provided for connecting the detector on one side to an intermediate point on said network and means being provided for periodically effectively altering said point of connection so that the reactance between said point and one end of said network is periodically changed from being predominantly inductive to being predominantly capacitative and vice versa by substantially equal amounts, said last mentioned means comprising a periodically and substantially sinusoidally varied reactance.

7. A stabilizer or monitor as set forth in claim 1 wherein the means for periodically changing the reactance in at least a portion of the network effect reactance changes without changing the impedance of said network, said network comprising series connected resistive, inductive and capacitative elements, means being provided for connecting the detector on one side to an intermediate point on said network, the ratio of the value of the resistance of the resonator to the value of the resistance in series therewith being substantially equal to the ratio of the resistance of that part of the network having one end directly connected to the resonator and on one side of said point to the resistance of that part of said network on the other side of said point.

8. A frequency stabilizer or monitor as set forth in claim 1 wherein the output from the detector is fed to a sense gate connected to be operated in synchronism with the periodic change of reactance of said network portion, the output from said sense gate being arranged to produce control of the frequency of said source.

References Cited in the file of this patent

UNITED STATES PATENTS

| | | |
|---|---|---|
| 2,564,005 | Halpern | Aug. 14, 1951 |
| 2,565,842 | Denis | Aug. 28, 1951 |
| 2,591,257 | Hershberger | Apr. 1, 1952 |